United States Patent
Taniguchi

(10) Patent No.: US 7,796,245 B2
(45) Date of Patent: Sep. 14, 2010

(54) ABERRATION MEASUREMENT APPARATUS AND ABERRATION MEASUREMENT METHOD

(75) Inventor: Yukio Taniguchi, Yokohama (JP)

(73) Assignee: Advanced LCD Technologies Development Center Co., Ltd., Yokohama-shi (JP)

( * ) Notice: Subject to any disclaimer, the term of this patent is extended or adjusted under 35 U.S.C. 154(b) by 377 days.

(21) Appl. No.: 12/043,657

(22) Filed: Mar. 6, 2008

(65) Prior Publication Data
US 2009/0009751 A1    Jan. 8, 2009

(30) Foreign Application Priority Data
Mar. 8, 2007    (JP) ............... 2007-057959

(51) Int. Cl.
*G01J 1/00*    (2006.01)
(52) U.S. Cl. ..................... 356/121
(58) Field of Classification Search .............. None
See application file for complete search history.

(56) References Cited

U.S. PATENT DOCUMENTS

| 6,312,373 | B1 * | 11/2001 | Ichihara ............. 356/515 |
| 6,456,382 | B2 * | 9/2002 | Ichihara et al. ........ 356/513 |
| 7,508,527 | B2 * | 3/2009 | Hill ................. 356/515 |

* cited by examiner

*Primary Examiner*—Tu T Nguyen
(74) *Attorney, Agent, or Firm*—Oblon, Spivak, McClelland, Maier & Neustadt, L.L.P.

(57) ABSTRACT

An aberration measurement apparatus measures the aberration of an imaging optical system. The apparatus includes an illumination system, a separation member, and a measurement unit. The illumination system supplies the imaging optical system with measurement light used to measure an aberration of the imaging optical system and background light different from the measurement light. The separation member separates the measurement light and the background light which have passed through the imaging optical system. The measurement unit measures the aberration of the imaging optical system on the basis of the measurement light separated by the separation member.

22 Claims, 8 Drawing Sheets

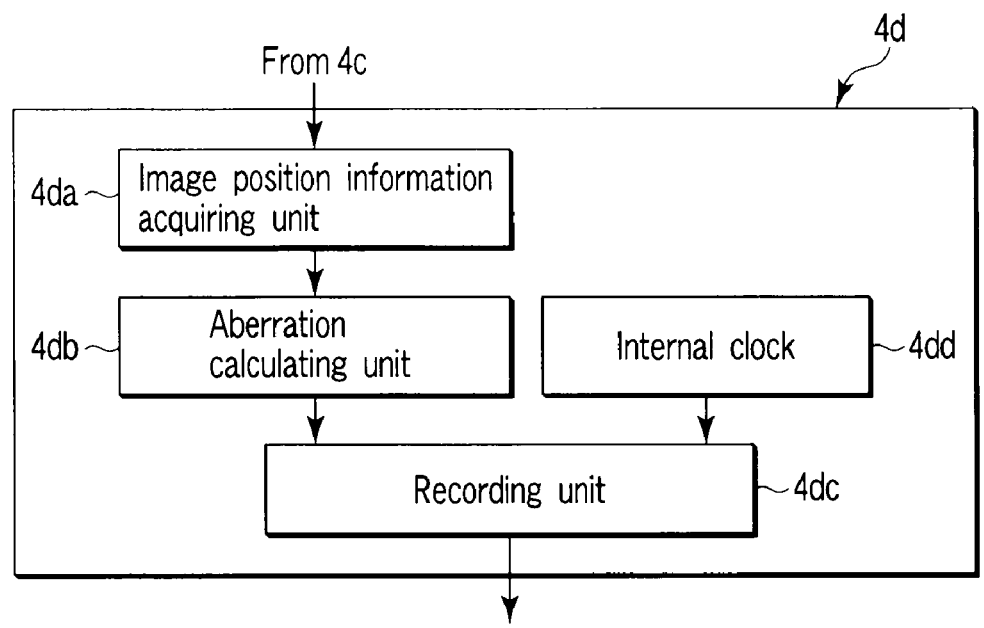
F I G. 2
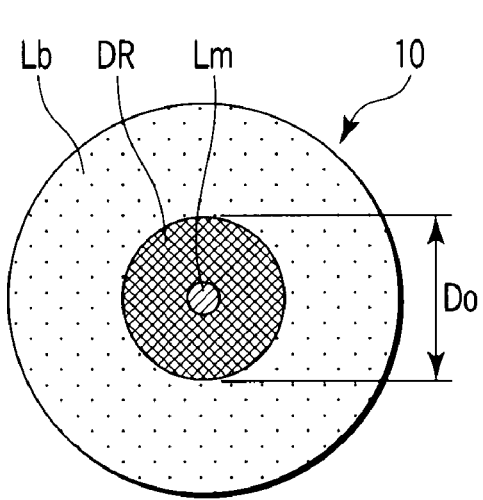
F I G. 3A
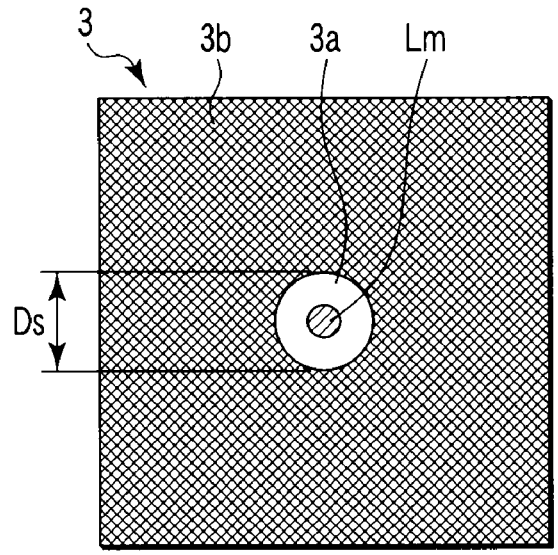
F I G. 3B

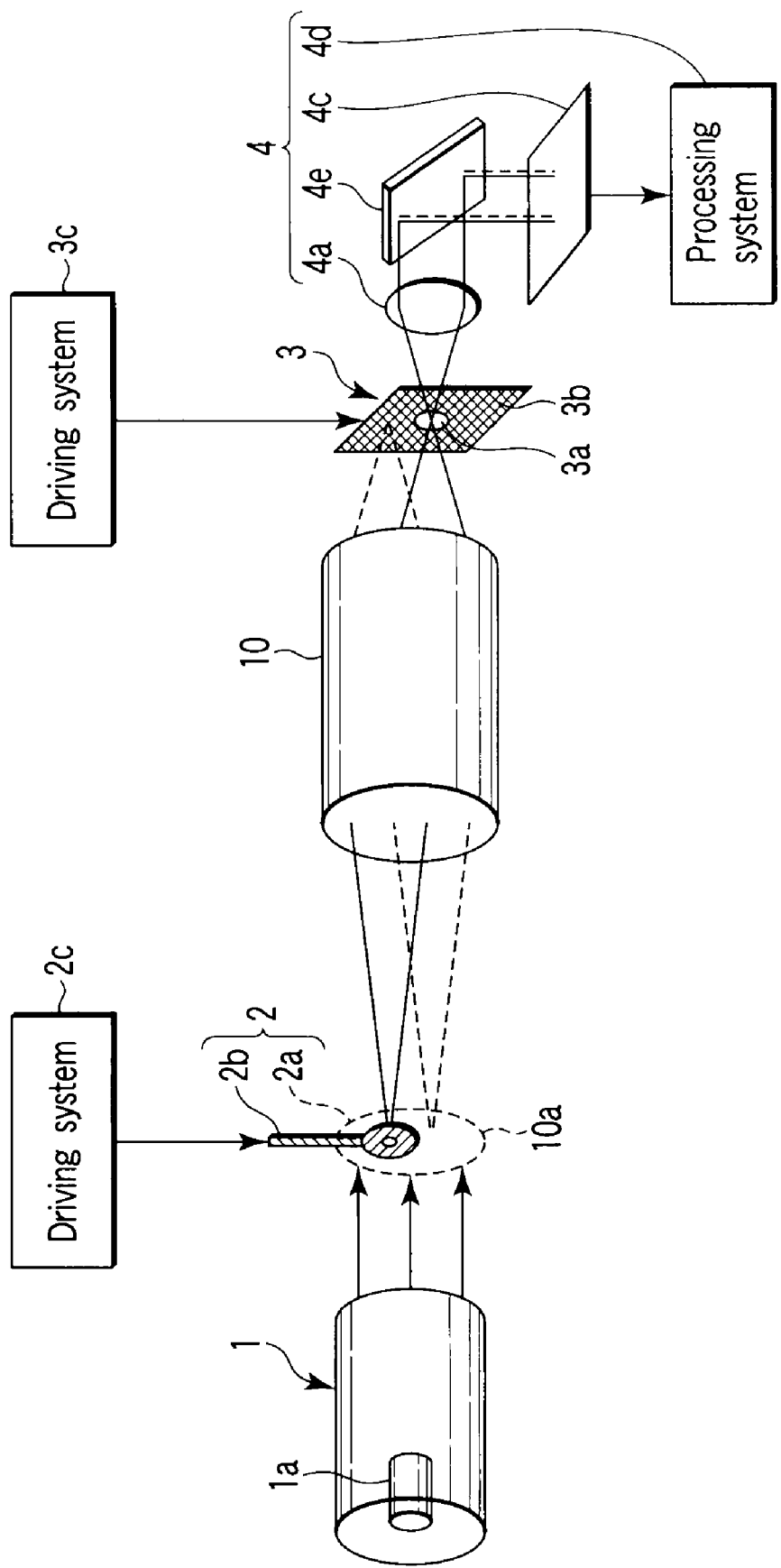
F I G. 6

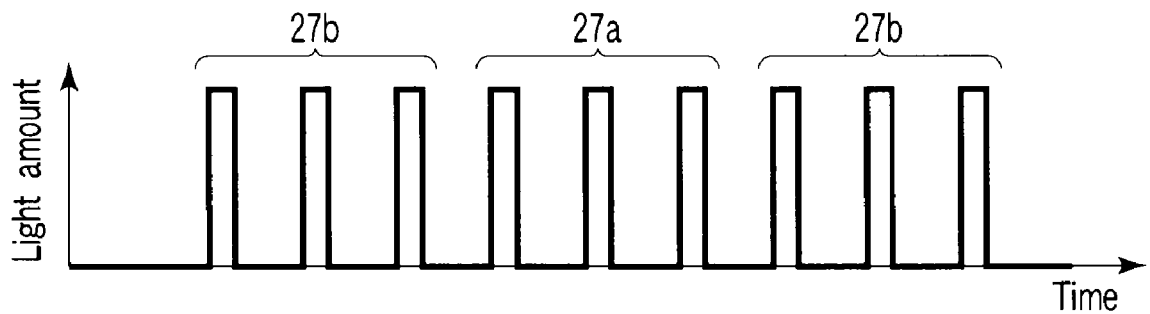
F I G. 10A
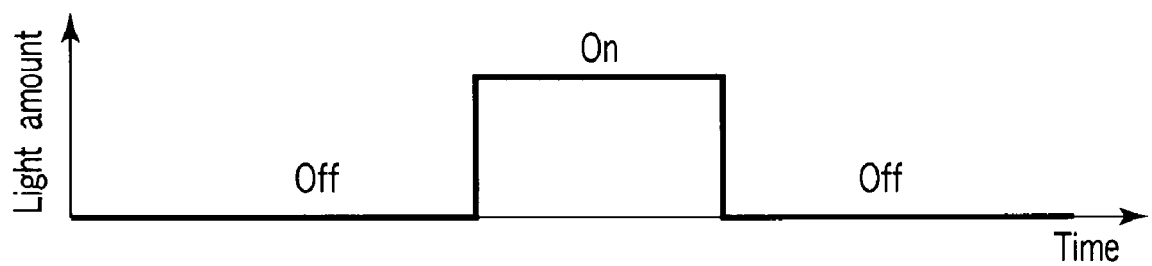
F I G. 10B
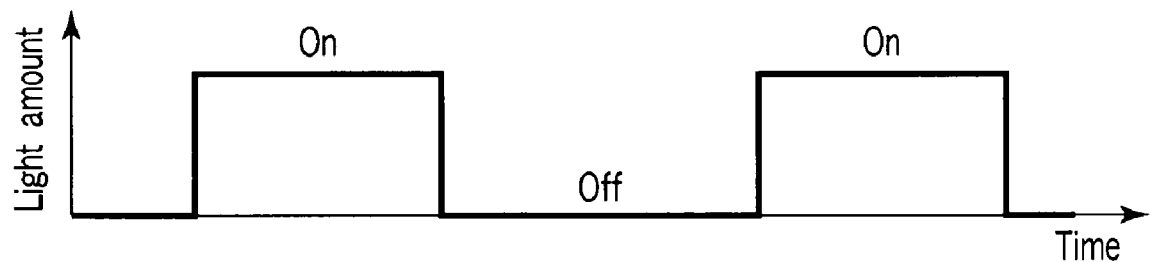
F I G. 10C

ABERRATION MEASUREMENT APPARATUS AND ABERRATION MEASUREMENT METHOD

CROSS-REFERENCE TO RELATED APPLICATIONS

This application is based upon and claims the benefit of priority from prior Japanese Patent Application No. 2007-057959, filed Mar. 8, 2007, the entire contents of which are incorporated herein by reference.

BACKGROUND OF THE INVENTION

1. Field of the Invention

The present invention relates to an aberration measurement apparatus and an aberration measurement method. More particularly, it relates to an apparatus and method for measuring the aberration of an imaging optical system for use in a laser process.

2. Description of the Related Art

In various laser processes, light passed through a light modulation device (such as a phase shifter, a photomask or a reticle) is generally imaged on an irradiation surface by an imaging optical system. Here, the laser process is "substance processing by laser" in a broad sense, and is a process which uses characteristics inherent in laser light, that is, directivity, monochromaticity and light collecting properties (high energy density) to produce various physical and chemical changes in the irradiation surface and/or a material having an irradiation surface.

As one example of laser process technology, there have been known a projection type crystallization device and method wherein excimer laser light is applied to a light modulation device such as a phase shifter, and light having a predetermined light intensity distribution which has passed through the light modulation device and which has been formed by an imaging optical system is applied to a non-monocrystalline semiconductor film (polycrystalline semiconductor film or amorphous semiconductor film) to melt this film so that a crystallized semiconductor film is formed. In the above device and method, a temperature gradient is produced in the melted region on the nonmonocrystalline semiconductor film in accordance with the light intensity distribution, and a crystal nucleus is formed in conformity to a point with the lowest light intensity, and then a crystal grows from the crystal nucleus toward its periphery such that a large-diameter crystal grain is created.

In a laser process device, a high-output light source such as an excimer laser, YAG laser or $CO_2$ laser is generally used. In this kind of device, as a light flux having high energy density passes through the imaging optical system, optical components such as lenses and mirrors constituting the imaging optical system and associated components such as lens frames and a housing (the optical components and the associated components are hereinafter generically referred to as optical members) are heated by light irradiation, and thus deform due to thermal expansion. In order to prevent the deformation of the optical members due to the thermal expansion, the imaging optical system is cooled off using, for example, a radiator plate, a liquid (water), a gas (air) or a Peltier element.

Good imaging performance, that is, reduced aberration is required for the imaging optical system used in the laser process device. Thus, various methods of measuring the aberration of the imaging optical system have been developed and carried out. Typical known aberration measurement methods of the imaging optical system include, for example, a measurement method using various interferometers, Hartmann method, Shack-Hartmann method, Foucault method and Ronchi method.

As described above, in the laser process device, the optical members constituting the imaging optical system are heated by the light flux having high energy density and thus deform due to thermal expansion. When the optical members deform due to the thermal expansion in response to the light irradiation in this manner, there is a possibility that the aberrant state of the imaging optical system deteriorates with time. Therefore, there has been a desire in connection with the laser process device to measure in real time the change of aberration when the light flux having high energy density is applied to the imaging optical system in a state close to an actual use condition.

However, in a conventional aberration measurement apparatus and method, the aberration of the imaging optical system is measured in a condition completely different from the actual use condition in the laser process device. Specifically, a light modulation device corresponding to a pattern to be processed is provided on the object plane of the imaging optical system in the actual laser process, whereas a pin hole is provided in the object plane of the imaging optical system in, for example, the Shack-Hartmann method and shearing interferometry. As a result, in the prior arts, weak light which has passed through the pin hole only passes through the imaging optical system, and it is therefore impossible to measure the change of aberration with time in the light entrance state close to the actual use condition.

BRIEF SUMMARY OF THE INVENTION

The present invention is directed to provide an aberration measurement apparatus and an aberration measurement method capable of measuring the aberration of an imaging optical system, for example, in the light entrance state close to an actual use condition.

In order to solve the problem described above, an aberration measurement apparatus according to a first aspect of the present invention includes;

an illumination system which supplies an imaging optical system with measurement light used to measure an aberration of the imaging optical system and background light different from the measurement light;

a separation member which separates the measurement light and the background light which have passed through the imaging optical system; and a measurement unit which measures the aberration of the imaging optical system on the basis of the measurement light separated by the separation member.

An aberration measurement method according to a second aspect of the present invention includes:

supplying the imaging optical system with measurement light for the measurement of an aberration of the imaging optical system and background light different from the measurement light;

separating the measurement light and the background light which have passed through the imaging optical system; and measuring the aberration of the imaging optical system on the basis of the measurement light separated in the separating step.

In the aberration measurement apparatus and method of the present invention, the imaging optical system as an optical system under test is supplied with the measurement light used to measure the aberration and the background light not used to measure the aberration. Specifically, the imaging optical system is supplied with, for example, the measurement light and the background light which are spatially separated in the object plane of the imaging optical system. The measurement light and the background light which have passed through the imaging optical system are separated from each other, and the aberration of the imaging optical system is measured on the basis of the separated measurement light. As a result, in the present invention, for example, the amount of the background light entering the imaging optical system is adjusted such that the aberration of the imaging optical system can be measured in the light entrance state close to an actual use condition of the imaging optical system in, for example, a laser process device.

Furthermore, in the present invention, the change of aberration with time is measured while the imaging optical system is being cooled off using cooling means for cooling off the imaging optical system, such that the performance of the cooling means can be evaluated. In other words, the configuration and cooling condition of the cooling means are changed, and at the same time, the change of aberration with time is repeatedly measured, such that it is possible to optimize, for example, a cooling mechanism, the cooling condition, the structure and material of the housing of the imaging optical system, and a method of maintaining the optical components in the imaging optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram schematically showing the internal configuration of a processing system in FIG. 1;

FIG. 3A is a diagram schematically showing a positional relation between measurement light and background light in the image plane of an imaging optical system, and FIG. 3B is a diagram schematically showing a positional relation between a light passing portion of a separation member and the measurement light;

FIG. 6 is a diagram schematically showing an aberration measurement apparatus of a type using shearing interferometry, according to a second embodiment of the present invention;

FIG. 10A is a diagram schematically showing the timing of pulse emission of an illumination system, FIG. 10B is a diagram schematically showing the timing of putting a pattern light generating member in or out of an optical path, and FIG. 10C is a diagram schematically showing the timing of putting a light shielding member in or out of the optical path.

DETAILED DESCRIPTION OF THE INVENTION

Figure 1:
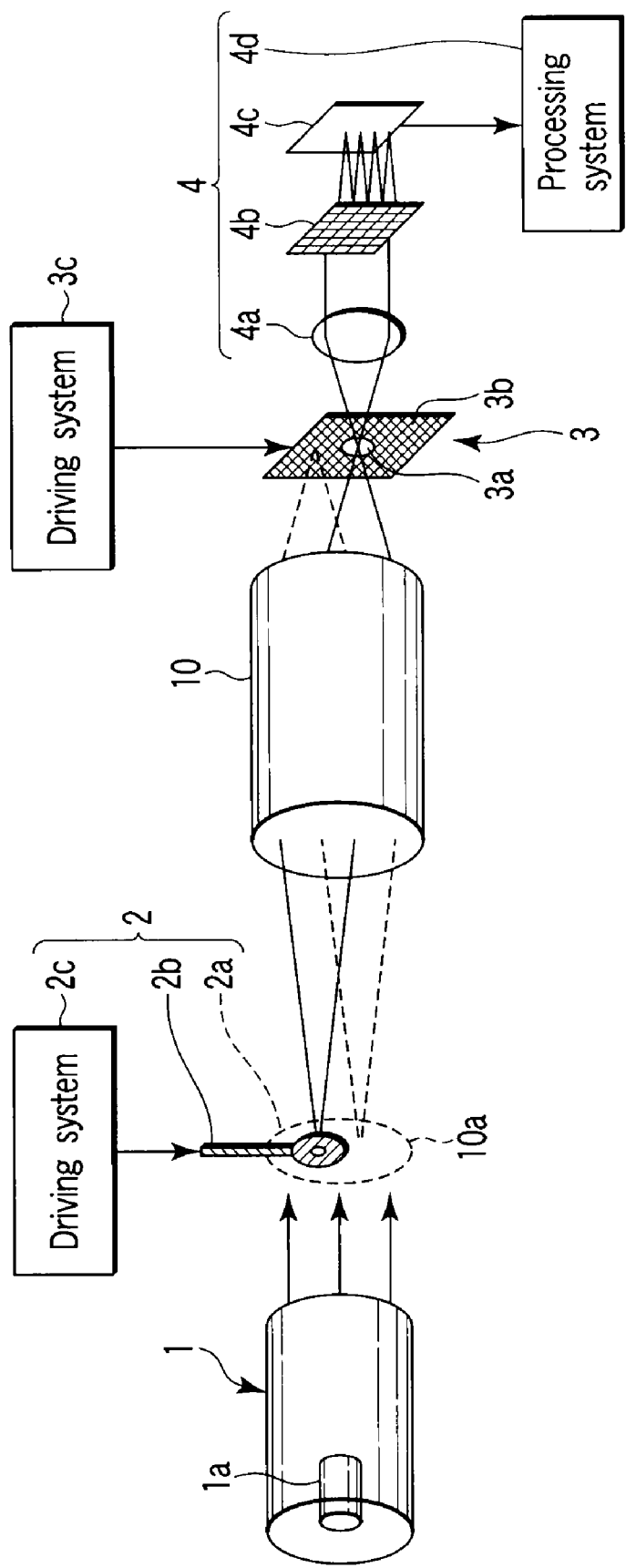
FIG. 1 is a diagram schematically showing an aberration measurement apparatus according to a first embodiment of the present invention.

Embodiments of the present invention will be described with reference to the accompanying drawings. FIG. 1 is a diagram schematically showing an aberration measurement apparatus according to a first embodiment of the present invention. In the present embodiment, the present invention is applied to a Shack-Hartmann type aberration measurement apparatus. As shown in FIG. 1, the aberration measurement apparatus of the present embodiment comprises an illumination system main unit 1, a pin hole member 2, a separation member 3 and a measurement unit 4 that are arranged along the optical axis of an imaging optical system 10 which is an optical system under test. The main unit 1 and the pin hole member 2 are located on the entrance side of the imaging optical system 10, and the separation member 3 and the measurement unit 4 are located on the exit side. This embodiment uses, as aberration measurement incident light, light having energy density substantially equal to that of light actually supplied to the imaging optical system 10. That is, measurement is made of the change of aberration with time caused by a temperature rise with time due to the supply of actually supplied light to the imaging optical system 10.

The illumination system main unit 1 has the same configuration as an illumination system of, for example, a device (such as a laser process device) in which the imaging optical system 10 is actually used, and has a light source 1a for emitting similar light. That is, the light source 1a emits light having energy density substantially equal to that of light actually supplied to the imaging optical system 10. The light from this light source 1a illuminates an effective region 10a on the object plane of the imaging optical system 10 after having passed through the pin hole member 2. The pin hole member 2 has a pin hole element 2a with a pin hole (generally, a passing portion for generating pattern light having a predetermined sectional shape) formed in its center, and a holding member 2b for holding the pin hole element 2a. The pin hole member 2 functions as a pattern light generating member for generating the pattern light (hereinafter simply referred to as "pin hole pattern light") having the predetermined sectional shape passed through the pin hole, from the incident light in the object plane of the imaging optical system 10, and causing this pin hole pattern light to enter the imaging optical system 10 as the measurement light.

The illumination system main unit 1 and the pin hole member 2 constitute an illumination system for supplying the imaging optical system 10 with measurement light used to measure the aberration of the imaging optical system 10 and background light which is not used to measure the aberration and which is different from the measurement light. In other words, the illumination system is configured to supply the imaging optical system 10 with the measurement light and the background light which are spatially separated in the object plane of the imaging optical system 10 by the pin hole member 2. That is, light having energy density substantially equal to that of light actually supplied in the actual device is separated into the measurement light and the background light.

The holding member 2b is connected to a driving system 2c and can turn on one end. As a result, the pin hole member 2 supported on the other end of the holding member 2b can two-dimensionally move along the object plane of the imaging optical system 10, and positions the pin hole at a predetermined position on the object plane of the imaging optical system 10.

The separation member 3 is disposed on the image plane of the imaging optical system 10, and has a light passing portion (light guiding portion) 3a for guiding the measurement light which has passed through the imaging optical system 10 to the measurement unit 4, and a shielding portion 3b for shielding the background light which has passed through the imaging optical system 10 from reaching the measurement unit 4. That is, the separation member 3 has a function to separate the measurement light and the background light which have passed through the imaging optical system 10. The separation member 3 is connected to a driving system 3c, and can be two-dimensionally moved by this driving system along the image plane of the imaging optical system 10, and has the light passing portion 3a positioned at a predetermined position on the image plane of the imaging optical system 10.

The measurement unit 4 has, starting from the light entering side, a collimator lens 4a, a micro-lens array 4b and a CCD camera 4c. A processing system 4d is connected to the CCD camera. The collimator lens 4a converts the measurement light which has passed through the light passing portion 3a of the separation member 3 into parallel light, and then guides the light to the entrance plane of the micro-lens array 4b. The micro-lens array 4b is composed of a large number of lens elements (or a large number of micro refraction surface elements) that are densely arranged vertically and horizontally, and divides, into wavefronts, a light flux entering from the collimator lens 4a. The CCD camera 4c is a two-dimensional image sensor having an imaging surface disposed on the rear focal plane of the micro-lens array 4b. The processing system 4d processes the output signal of the CCD camera 4c.

Specifically, the processing system 4d has an image position information acquiring unit 4da, an aberration calculating unit 4db and a recording unit 4dc, as shown in FIG. 2. The image position information acquiring unit 4da acquires displacement information for a large number of pin hole two-dimensional images formed on the imaging surface of the CCD camera 4c via the micro-lens array 4b. The aberration calculating unit 4db finds by calculation the wavefront aberration of the imaging optical system 10 (the wavefront aberration in the pupil plane of the imaging optical system 10: also simply referred to as "the aberration of the imaging optical system 10" in the present specification) on the basis of the displacement information from the image position information acquiring unit 4da. The recording unit 4dc records the change of the aberration of the imaging optical system 10 with time on the basis of an output of the aberration calculating unit 4db and a preset output of an internal clock 4dd.

Described specifically below is the detailed configurations of the imaging optical system 10 as an optical system under test and of the illumination system main unit 1, the pin hole member 2, the separation member 3 and the measurement unit 4 that constitute the aberration measurement apparatus, in order to make it easier to understand the present invention.

The imaging optical system 10 has a reducing magnification of 1/5. The object side numerical aperture NAo of the imaging optical system 10 is 0.03, and the image side numerical aperture NAi thereof is 0.15. The object side effective region (field) of the imaging optical system 10 is in the shape of a circle of 10 mm in diameter, and the image side effective region thereof is in the shape of a circle of 2 mm in diameter.

The light source 1a of the illumination system main unit 1 is an XeCl excimer laser for supplying light at a wavelength $\lambda$ of 308 nm, and its output is 200 mJ/pulse×100 Hz (=20W).

The pin hole element 2a is made of a round copper thin film (light shielding member) having a thickness of 1 μm and a radius of about 1.5 mm in which a round through-hole or pin hole (portion through which the pin hole pattern light passes) of 1 μm in diameter is formed in the center. The holding member 2b has a round metal frame with an inside diameter (diameter) of about 3 mm, and the pin hole element 2a is held in this metal frame.

Thus, the area ($\pi \times 1.5$ mm×1.5 mm) of the pin hole element 2a is set to be sufficiently smaller than the area ($\pi \times 5$ mm×5 mm) of the object side effective region of the imaging optical system 10. However, an extremely small diameter of the pin hole element 2a is not preferable because diffracted light from the periphery of the pin hole element 2a overlaps a pin hole image in the image plane of the imaging optical system 10. The diameter of the pin hole element 2a is sufficient if it is more than several times a radius 0.61 $\lambda$/NAo (6.3 μm in the present embodiment) of the point image distribution range (Airy disk) of the imaging optical system 10.

An extremely large diameter of the pin hole element 2a is not preferable because the amount of background light passing through parts other than the pin hole is reduced in the object side effective region 10a of the imaging optical system 10. The area of the pin hole element 2a is sufficient if it is reduced to several ten percent of the area of the object side effective region of the imaging optical system 10.

In the measurement unit 4, the focal distance of the collimator lens 4a is 13 mm. The microlens array 4b has a square entrance plane of 200 μm×200 μm, and is composed of 20×20 (a total of 400) lens elements having a focal distance of 18 mm that are densely formed vertically and horizontally. The two-dimensional image sensor 4c is a UV-compatible CCD camera.

The measurement light which has passed through the pin hole of the pin hole element 2a and the background light which has passed the periphery of the pin hole element 2a enter the image plane of the imaging optical system 10. As shown in FIG. 3A, a dark portion DR where the light does not reach is formed between the pin hole image formed by measurement light Lm and a peripheral bright portion formed by background light Lb in the image plane of the imaging optical system 10. The background light is unnecessary light and become noise in the aberration measurement of the imaging optical system 10, and therefore has to be eliminated. The background light is eliminated and the measurement light is passed by the separation member 3 provided in the image plane of the imaging optical system 10.

In the separation member 3, the light passing portion (light guiding portion) 3a is desirably a through-hole provided in a light shielding member so that the passed light may not produce new aberration. As the shielding portion 3b, a reflector such as a metal plate or a multilayer film mirror is used. As shown in FIG. 3B, it is important that the diameter Ds of the light passing portion 3a is so large as to completely pass the measurement light Lm which forms a pin hole image sized about several times 1.22 λ/NAo, and is so small that the background light may not sneak in.

That is, it is preferable that the diameter Ds of the light passing portion 3a satisfies the following Conditional Expressions (1) and (2):

$$Ds >> 1.22\, \lambda/NAo \quad (1)$$

$$Do - Ds >> 1.22\, \lambda/NAo \quad (2)$$

where λ is the wavelength of the light (308 nm in the present embodiment), NAo is the object side numerical aperture of the imaging optical system 10 (0.03 in the present embodiment), and Do is the inside diameter (diameter) of the background light in the image plane of the imaging optical system 10 (3 mm/5=0.6 mm in the present embodiment).

In the present embodiment, the round through-hole 3a having a diameter Ds of 0.4 mm is formed in an aluminum plate (light shielding member) having a thickness of 0.2 mm such that the separation member 3 is produced. Then, the separation member 3 is fixed to a movable stage of the driving system 3c, and the through-hole 3a of the separation member 3 is positioned at a predetermined position on the image plane of the imaging optical system 10 so that the measurement light (i.e., light to form a pin hole image) alone may pass through the through-hole 3a and the background light may be shielded by the shielding portion 3b.

In the present embodiment, Ds=0.4 mm on the left side of Conditional Expression (1), and 1.22 λ/NAo=2.5 µm=0.0025 mm on the right side of Conditional Expression (1), so that Conditional Expression (1) is satisfied. Moreover, Do−Ds=0.6 mm−0.4 mm=0.2 mm on the left side of Conditional Expression (2), and 1.22 λ/NAo=0.0025 mm on the right side of Conditional Expression (2), so that Conditional Expression (2) is also satisfied.

In the present embodiment, the illumination system comprising the illumination system main unit 1 and the pin hole member 2 supplies the imaging optical system 10 with the measurement light and the background light which have been spatially separated in the object plane of the imaging optical system 10. The measurement light and the background light which have passed through the imaging optical system 10 are spatially separated by the separation member 3, and the measurement light alone is guided to the measurement unit 4. The measurement unit 4 measures the change of the wavefront aberration of the imaging optical system 10 with time in accordance with the known Shack-Hartmann method on the basis of the measurement light separated by the separation member 3. Thus, in the aberration measurement apparatus of the present embodiment, for example, the amount of the background light entering the imaging optical system 10 is adjusted such that the change of the aberration of the imaging optical system 10 with time can be measured in the light entrance state close to an actual use condition of the imaging optical system 10 in, for example, a laser process device.

Specifically, in the present embodiment, the change of the wavefront aberration of the imaging optical system 10 with time was measured while the XeCl excimer laser 1a having an output of 20 W (200 mJ/pulse×100 Hz) was being oscillated at 100 Hz in the aberration measurement apparatus shown in FIG. 1. At this point, the energy density of the light flux entering the imaging optical system 10 was equal to that in a current projection type crystallization device. As a result of the measurement, it was found out that the wavefront aberration of the imaging optical system 10 immediately after the oscillation of the XeCl excimer laser 1a was 0.05λ in root mean square (RMS) and was thus satisfactory, but the wavefront aberration deteriorated to about 0.1λ several seconds after the start of the oscillation and also gradually deteriorated later.

Figure 4:
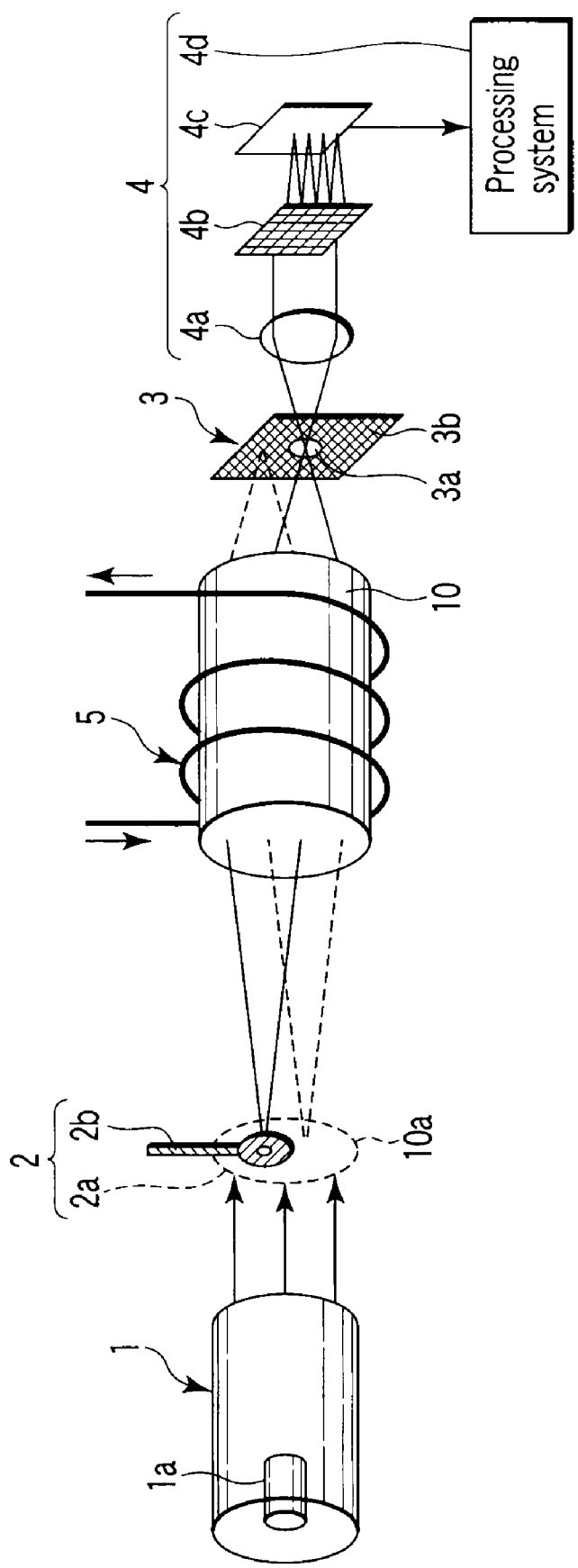
FIG. 4 is a diagram showing how to measure the change of aberration with time while cooling off the imaging optical system in the aberration measurement apparatus in FIG. 1.

Then, as shown in FIG. 4, cooling means 5 for cooling off the imaging optical system 10 using circulating water was attached to the aberration measurement apparatus in FIG. 1, and the change of the wavefront aberration of the imaging optical system 10 with time was measured while the cooling means 5 was being actuated to cool off the imaging optical system 10. As a result of the measurement, it was found out that the wavefront aberration of the imaging optical system 10 remained substantially unchanged and almost fixed at 0.05 λRMS from the start of the oscillation of the XeCl excimer laser 1a. That is, it was ascertained that the imaging optical system 10 was cooled off by the effect of the cooling means 5 such that the satisfactory imaging performance of the imaging optical system 10 could be maintained.

In the embodiment described above, the pin hole member 2 as a pattern light generating member comprises the pin hole element 2a including the pattern light passing portion for passing the pin hole pattern light and the light shielding member enclosing the pattern light passing portion, and the holding member 2b for holding the light shielding member of the pin hole element 2a. However, this is not a limitation, and various forms of the configuration of the pin hole member are possible.

Figure 5A:
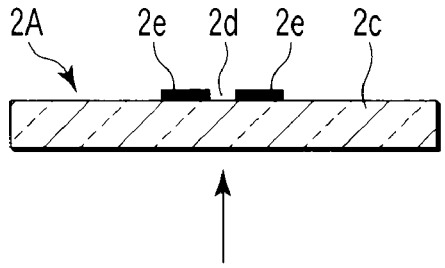
FIG. 5A is a diagram schematically showing a first modification of a pin hole member.

For example, a pin hole member 2A shown in FIG. 5A comprises a light-transmitting substrate 2c formed of, for example, quartz glass, a pattern light passing portion 2d which is provided in the light-transmitting substrate 2c and which passes the pin hole pattern light, and a light shielding member 2e provided in the light-transmitting substrate 2c to enclose the pattern light passing portion 2d. The light shielding member 2e is formed of a metal such as chromium (Cr) and is a light shielding thin film having a predetermined shape, for example, a round shape. The pattern light passing portion 2d is a round through-hole formed in the center of the light shielding member 2e. In this case, the light-transmitting substrate 2c functions as a holding member of the light shielding member 2e as a pin hole element.

Figure 5B:
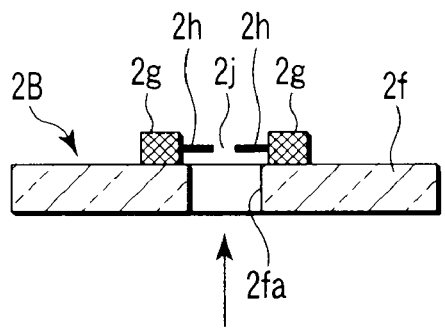
FIG. 5B is a diagram schematically showing a second modification of a pin hole member.

A pin hole member 2B shown in FIG. 5B comprises a light-transmitting substrate 2f in the shape of a round plate which is formed of, for example, quartz glass and which has a round through-hole 2fa in the center, an annular light shielding frame member 2g attached onto the light-transmitting substrate 2f to enclose the through-hole 2fa, and a disk-shaped light shielding member 2h provided inside the frame member 2g. The light shielding member 2h is formed of a metal such as copper, and a round through-hole 2j as a pattern light passing portion is formed in the center of the light shielding member 2h. In this case, the light-transmitting substrate 2f functions as a holding member of a pin hole element composed of the frame member 2g and the light shielding member 2h. In FIGS. 5A, 5B, arrows indicate the entrance direction of light.

In the same manner as the pin hole member 2 shown in FIGS. 1, 4, the pin hole members 2A, 2B shown in FIGS. 5A, 5B generate pin hole pattern light from the incident light in the object plane of the imaging optical system 10, and cause this pin hole pattern light to enter the imaging optical system 10 as the measurement light. However, this is not a limitation. That is, without using the pin hole member, it is also possible to generate pattern light having a suitable shape other than the pin hole pattern light in the effective region 10a in the object plane of the imaging optical system 10 and cause this pattern light having the predetermined shape to enter the imaging optical system 10 as the measurement light.

Furthermore, in the embodiment described above, the measurement light which has passed through the light passing portion 3a of the separation member 3 is guided to the measurement unit 4, and the background light is shielded by the shielding portion 3b from reaching the measurement unit 4. However, this is not a limitation. For example, measurement light and background light different in wavelength may be used, and the measurement light and the background light which have passed through the imaging optical system 10 may be separated from each other by the effect of a separation member configured by a wavelength filter such as a multi-layer film. Moreover, for example, measurement light and background light different in polarization state may be used, and the measurement light and the background light which have passed through the imaging optical system 10 may be separated from each other by the effect of a separation member such as an analyzer.

A phenomenon has been known wherein diffracted light called apparent Young's peripheral wave is emitted from the edge of the diaphragm of the imaging optical system (refer to "APPLIED OPTICS I", p. 205, by Tsuruta). When this peripheral wave has become noise and substantially affect the measurement of aberration, it is desirable to shield the peripheral wave from reaching the measurement unit 4. Specifically, an annular shielding member can be provided in a region corresponding to the edge of the diaphragm (not shown) of the imaging optical system 10 at a position optically conjugate with this diaphragm. In other words, shielding members can be provided in an imaging position on the edge of the diaphragm of the imaging optical system and in the vicinity thereof.

Moreover, in the embodiment described above, the present invention is applied to the Shack-Hartmann type aberration measurement apparatus. In other words, the measurement unit 4 is configured to measure the aberration of the imaging optical system 10 on the basis of the Shack-Hartmann method. However, this is not a limitation, and the present invention can also be applied to an aberration measurement apparatus of a suitable type other than the Shack-Hartmann method. As one example, an aberration measurement apparatus of a type which uses shearing interferometry according to a second embodiment of the present invention is described below with reference to FIG. 6.

The aberration measurement apparatus of the shearing interferometry shown in FIG. 6 has a configuration similar to that of the Shack-Hartmann type aberration measurement apparatus in FIG. 1, but is different in configuration from that in FIG. 1 in that a parallel flat plate 4e is used in a measurement unit 4 instead of the microlens array 4b. In the aberration measurement apparatus according to this embodiment, measurement light from a separation member 3 is converted into parallel light by a collimator lens 4a and enters the parallel flat plate 4e, and front surface reflected light reflected by the front surface of the parallel flat plate 4e and rear surface reflected light reflected by the rear surface of the parallel flat plate 4e reach the imaging surface of a CCD camera 4c. A processing system 4d measures the aberration of the imaging optical system 10 on the basis of information on the interference between the front surface reflected light and the rear surface reflected light.

In addition, in the first and second embodiments described above, the illumination system comprising the illumination system main unit 1 and the pin hole member 2 supplies the imaging optical system 10 with the measurement light and the background light which have been spatially separated by the object plane of the imaging optical system 10. However, this is not a limitation, and the illumination system can also supply the imaging optical system with the measurement light and the background light which have been temporally separated. Described as one example of which with reference to FIG. 7 is an aberration measurement apparatus according to a third embodiment of a type which temporally separates the measurement light and the background light and then supplies them to the imaging optical system.

Figure 7:
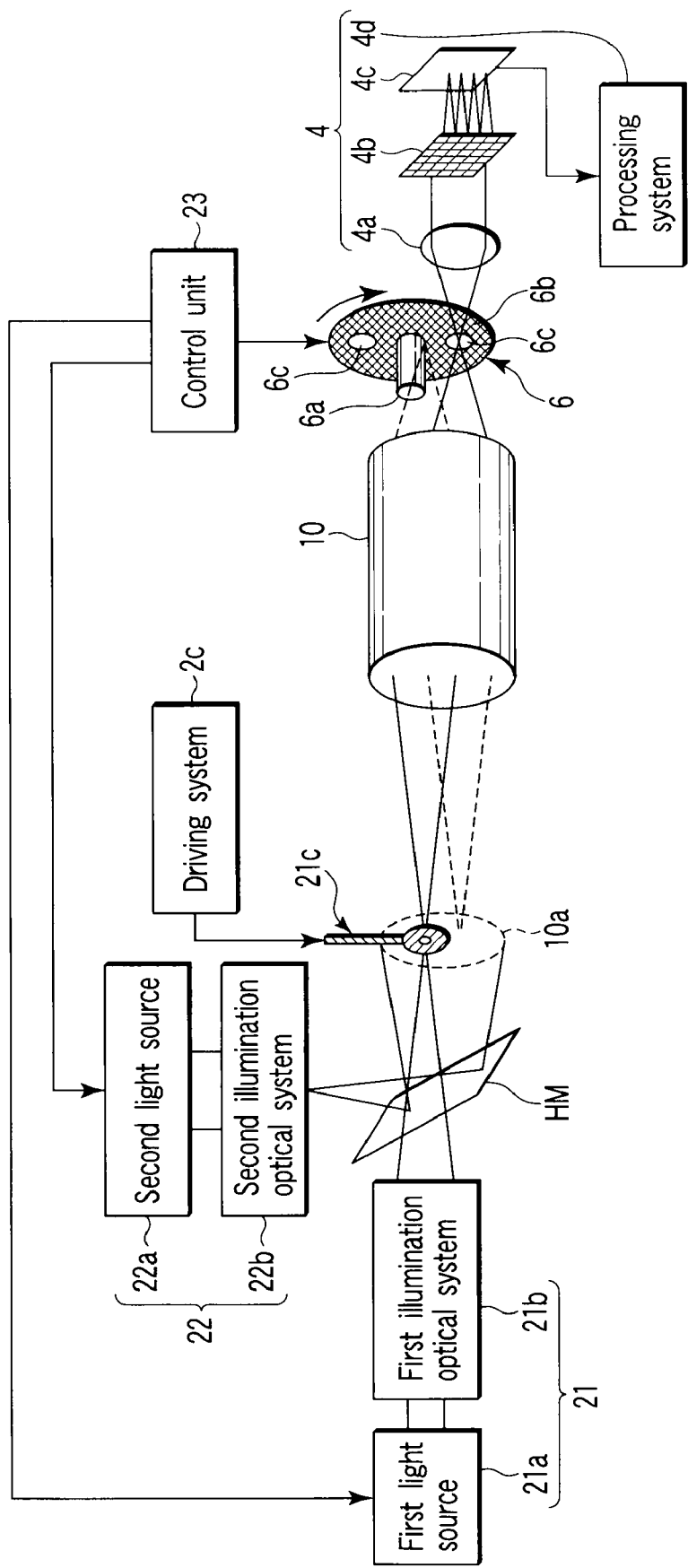
FIG. 7 is a diagram schematically showing an aberration measurement apparatus of a type which temporally separates measurement light and background light and then supplies them to an imaging optical system, according to a third embodiment of the present invention.

The configuration of the aberration measurement apparatus shown in FIG. 7 is similar to that of the aberration measurement apparatus in the first embodiment, but is different from that in FIG. 1 in the illumination system and the separation member. An illumination system of the aberration measurement apparatus shown in FIG. 7 has a first illumination system 21 for supplying measurement light, a second illumination system 22 for supplying background light, and a control unit 23 for controlling the timing of the supply of the measurement light from the first illumination system 21 and the timing of the supply of the background light from the second illumination system 22.

Specifically, the first illumination system 21 has a first light source 21a such as XeCl excimer laser, a first illumination optical system 21b for collecting the light from the first light source 21a onto the object plane of the imaging optical system 10, and a pattern light generating member 21c for generating pattern light from incident light in the object plane of the imaging optical system 10 and causing this pattern light to enter the imaging optical system 10 as the measurement light. Although the configuration using the pin hole member 2 shown in FIG. 1 is illustrated as the pattern light generating member 21c in FIG. 7, it is also possible to use, for example, the pin hole member 2A shown in FIG. 5A or the pin hole member 2B shown in FIG. 5B, and it is also possible to dispense with the pattern light generating member 21c.

The second illumination system 22 has a second light source 22a such as XeCl excimer laser, and a second illumination optical system 22b for illuminating the effective region 10a on the object plane of the imaging optical system 10 with the light from the second light source 22a. A half mirror (beam splitter) HM common to the first illumination system 21 and the second illumination system 22 is disposed between the object plane of the imaging optical system 10, and the first illumination optical system 21b and the second illumination optical system 22b.

Figure 8A:
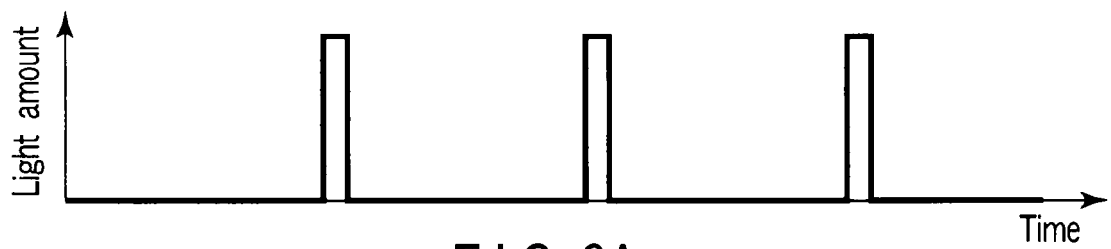
FIG. 8A is a diagram schematically showing the timing of pulse emission of a first illumination system.
Figure 8B:
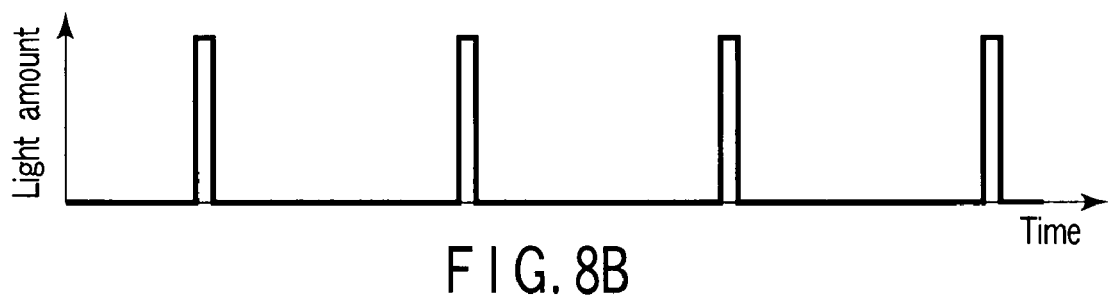
FIG. 8B is a diagram schematically showing the timing of pulse emission of a second illumination system.

The control unit 23 controls the pulse oscillation of the first light source 21a of the first illumination system 21 in accordance with the timing shown in FIG. 8A, and also controls the pulse oscillation of the second light source 22a of the second illumination system 22 in accordance with the timing shown in FIG. 8B. Specifically, the control unit 23 causes the first light source 21a to oscillate for the number of pulses necessary for the measurement of the aberration of the imaging optical system 10 and also causes the second light source 22a to oscillate at a pulse frequency necessary to provide a light entrance state close to an actual use condition so that the supply timing of the measurement light from the first illumination system 21 may be different from the supply timing of the background light from the second illumination system 22.

The aberration measurement apparatus shown in FIG. 7 comprises, as a separation member for separating the measurement light and the background light which have passed through the imaging optical system 10, a chopper 6 having a selectively light shielding rotating plate 6b which is disposed on the image plane of the imaging optical system 10 and which rotates by the action of a motor 6a in accordance with the supply timings of the measurement light and the background light. The rotating plate 6b is formed by a non-light-transmitting round plate, and is provided, for example, with a pair of through-holes 6c as a light-transmitting portion at positions symmetrical with respect to the rotation axis of the rotating plate 6b.

Figure 8C:
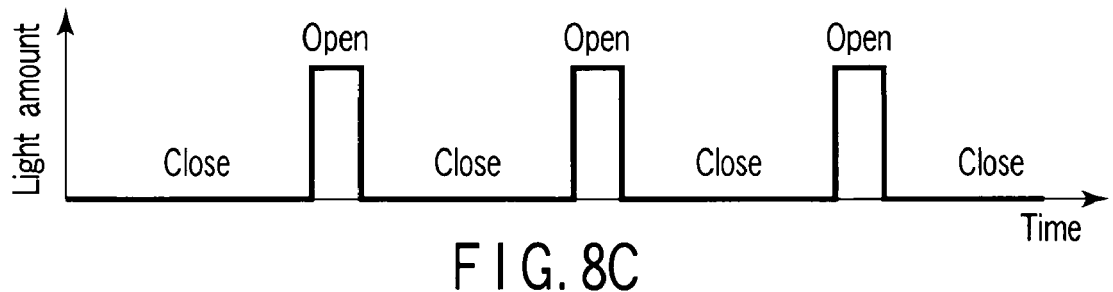
FIG. 8C is a diagram schematically showing the timing of rotation control of a chopper.

The control unit 23 controls the rotation of the rotating plate 6b of the chopper 6 in accordance with the timing shown in FIG. 8C, such that the through-holes 6c are in an open state for the measurement light which has passed through the imaging optical system 10, and functions as a light guiding portion for guiding the measurement light to the measurement unit 4. Moreover, the through-holes 6c are in a closed state for the background light which has passed through the imaging optical system 10, and the rotating plate 6b functions as a shielding portion for shielding the background light from reaching the measurement unit 4.

In the embodiment in FIG. 7, two light sources 21a, 22a are used, and thus the pulse oscillation of the first light source 21a and the pulse oscillation of the second light source 22a are different from each other in timing such that the measurement light and the background light are supplied to the imaging optical system 10 in a temporally separated manner (i.e., the time at which the measurement light is supplied to the imaging optical system 10 is made different from the time at which the background light is supplied to the imaging optical system 10 so that the measurement light and the background light are not simultaneously supplied to the imaging optical system 10). However, this is not a limitation, and, for example, one common light source can switch between two illumination optical systems such that the temporally separated measurement light and background light are supplied to the imaging optical system.

Figure 9:
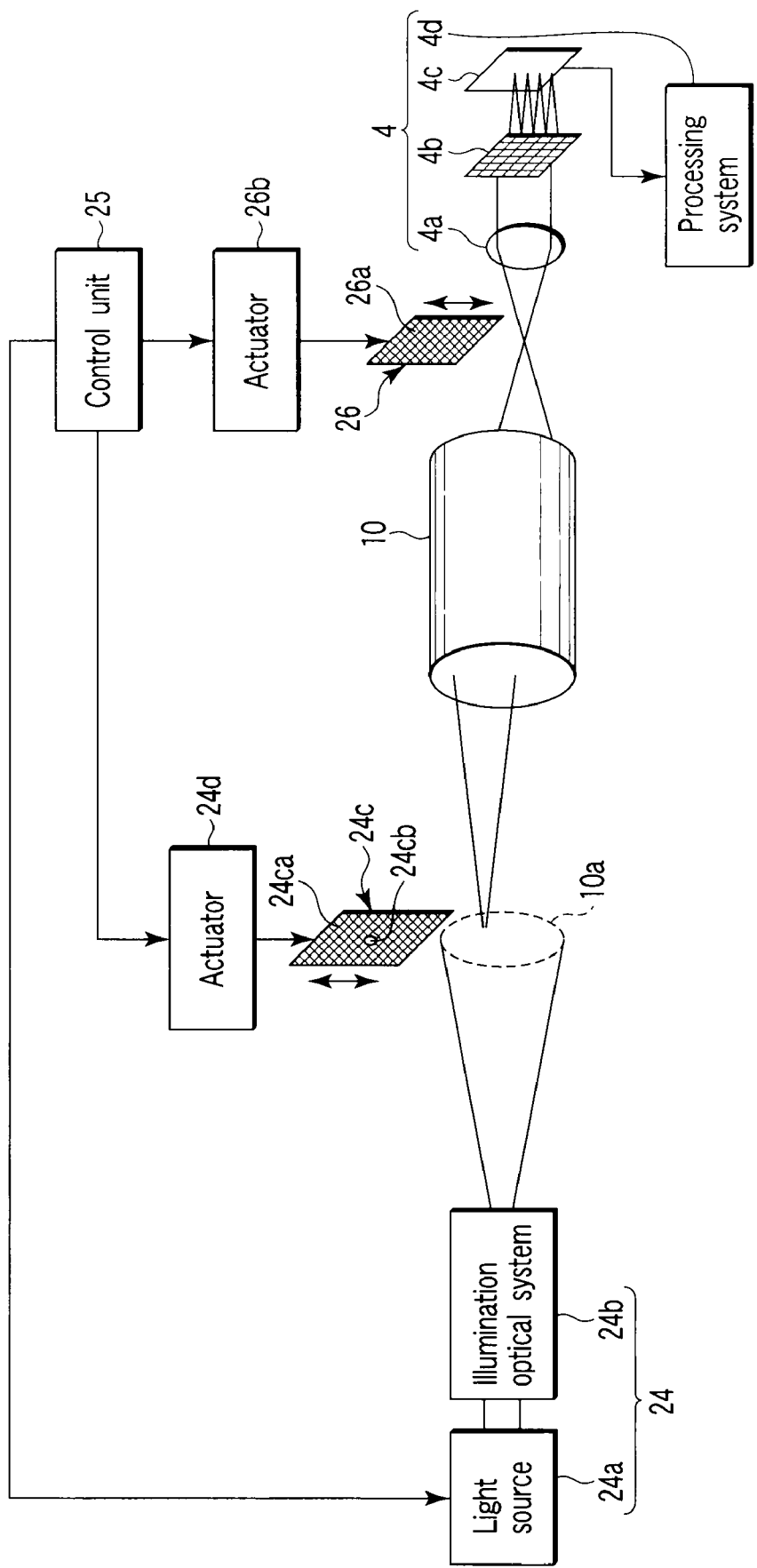
FIG. 9 is a diagram schematically showing an aberration measurement apparatus of a type which temporally separates measurement light and background light and then supplies them to an imaging optical system, according to a fourth embodiment of the present invention.

As in a fourth embodiment shown in FIG. 9, for example, a pattern light generating member 24c can be switched to be put in and out of the optical path of one common light source 24a as indicated by an arrow such that the temporally separated measurement light and background light are supplied to the imaging optical system 10. An aberration measurement apparatus shown in FIG. 9 comprises an illumination system 24 for temporally separating measurement light and background light and then supplying them to the imaging optical system 10, a control unit 25 for controlling the operation of the illumination system 24, and a separation member 26 for separating the measurement light and the background light which have passed through the imaging optical system 10.

The illumination system 24 has the light source 24a such as XeCl excimer laser, an illumination optical system 24b for illuminating the effective region 10a on the object plane of the imaging optical system 10 with the light from the light source 24a, and the pattern light generating member 24c configured to be movable along the direction of the arrow so that it is freely put in and out of the optical path along the object plane of the imaging optical system 10. The pattern light generating member 24c is configured, for example, by providing a pin hole 24cb in the center of a light shielding member 24ca capable of covering the entire effective region 10a on the object plane of the imaging optical system 10 when put in the optical path. When the pattern light generating member 24c is, for example, put in the optical path, the pin hole 24cb is located in the center of the effective region 10a.

The control unit 25 controls the supply timing of the light from the illumination system 24, and also controls the timing of putting the pattern light generating member 24c in or out of the optical path via an actuator 24d. The separation member 26 comprises a light shielding member 26a which is provided to be movable in, for example, the direction of an arrow and which is capable of covering the entire effective region on the image plane of the imaging optical system 10 when moved downward and put into the optical path, and an actuator 26b which moves the light shielding member 26a along the image plane of the imaging optical system 10 as indicated by an arrow so that it is freely put in and out of the optical path. The control unit 25 controls the timing of putting the light shielding member 26a in or out of the optical path via the actuator 26b.

In a modification in FIG. 9, the control unit 25 controls pulse oscillation of the light source 24a in the illumination system 24 in accordance with the timing shown in FIG. 10A. Specifically, out of pulsed light oscillated from the light source 24a, light for the number of pulses necessary for the measurement of the aberration of the imaging optical system 10 is used as measurement light 27a, and light for the number of pulses necessary to provide a state of light entering the imaging optical system 10 close to an actual use condition is used as background light 27b.

In accordance with the timing shown in FIG. 10B, the control unit 25 puts the pattern light generating member 24c into the optical path in response to the oscillation of the measurement light 27a from the light source 24a, and puts the pattern light generating member 24c out of the optical path in response to the oscillation of the background light 27b from the light source 24a. In FIG. 10B, the state of the pattern light generating member 24c put in the optical path is indicated by ON, and the state of the pattern light generating member 24c put out of the optical path is indicated by OFF. Thus, the illumination system 24 including the pattern light generating member 24c supplies the temporally separated measurement light and background light to the imaging optical system 10. Although FIG. 10A and FIG. 10B have been described with the pulsed light, the light is not limited to the pulsed light and may be a continuously oscillated light flux.

Furthermore, the control unit 25 controls the putting of the light shielding member 26a in and out of the optical path in accordance with the timing shown in FIG. 10C, such that the light shielding member 26a and the actuator 26b function as separation members, thereby guiding the measurement light which has passed through the imaging optical system 10 to the measurement unit 4 and shielding the background light which has passed through the imaging optical system 10 from reaching the measurement unit 4. In FIG. 10C, the state of the light shielding member 26a put in the optical path is indicated by ON, and the state of the light shielding member 26a put out of the optical path is indicated by OFF.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An aberration measurement apparatus which measures the aberration of an imaging optical system, the apparatus comprising:

an illumination system which supplies the imaging optical system with measurement light used to measure an aberration of the imaging optical system and background light different from the measurement light;

a separation member which separates the measurement light and the background light which have passed through the imaging optical system; and a measurement unit which measures the aberration of the imaging optical system on the basis of the measurement light separated by the separation member.

2. The aberration measurement apparatus according to claim 1, wherein the illumination system is configured to supply the imaging optical system with the measurement light and the background light which are spatially separated in an object plane of the imaging optical system.

3. The aberration measurement apparatus according to claim 2, wherein the illumination system has an illumination system main unit which supplies light to the object plane of the imaging optical system, and a pattern light generating member which generates pattern light having a pattern from incident light in the object plane of the imaging optical system and causes the pattern light to enter the imaging optical system as the measurement light.

4. The aberration measurement apparatus according to claim 3, wherein the pattern light generating member has a pattern light passing portion which passes the pattern light, a light shielding member enclosing the pattern light passing portion, and a holding member for holding the light shielding member.

5. The aberration measurement apparatus according to claim 4, wherein the holding member has a light-transmitting substrate.

6. The aberration measurement apparatus according to claim 3, wherein the pattern light generating member has a light-transmitting substrate, a pattern light passing portion which is provided in the light-transmitting substrate and which passes the pattern light, and a light shielding member provided in the light-transmitting substrate to enclose the pattern light passing portion.

7. The aberration measurement apparatus according to claim 1, wherein the separation member has a light guiding portion to guide the measurement light which has passed through the imaging optical system to the measurement unit, and a shielding portion to shield the background light which has passed through the imaging optical system from reaching the measurement unit.

8. The aberration measurement apparatus according to claim 7, wherein the light guiding portion has a through-hole provided in a light shielding member disposed on an image plane of the imaging optical system.

9. The aberration measurement apparatus according to claim 1, wherein the illumination system is configured to supply the imaging optical system with the measurement light and the background light which are temporally separated.

10. The aberration measurement apparatus according to claim 9, wherein the illumination system has a first illumination system which supplies the measurement light, a second illumination system which supplies the background light, and a control unit which controls the timing of the supply of the measurement light from the first illumination system and the timing of the supply of the background light from the second illumination system.

11. The aberration measurement apparatus according to claim 10, wherein the first illumination system has a pattern light generating member which generates predetermined pattern light from incident light in the object plane of the imaging optical system and causes the predetermined pattern light to enter the imaging optical system as the measurement light.

12. The aberration measurement apparatus according to claim 9, wherein the separation member has a light guiding portion to guide the measurement light which has passed through the imaging optical system to the measurement unit, and a shielding portion to shield the background light which has passed through the imaging optical system from reaching the measurement unit.

13. The aberration measurement apparatus according to claim 12, wherein the shielding portion has a light shielding rotating plate which is disposed on the image plane of the imaging optical system and which rotates in accordance with the supply timings of the measurement light and the background light, and the light guiding portion has at least one through-hole provided in the rotating plate.

14. The aberration measurement apparatus according to claim 9, wherein the illumination system has a light source which supplies a light flux, a pattern light generating member freely put in and out of an optical path in the object plane of the imaging optical system, and a control unit which controls the timing of the supply of the light flux from the light source and the timing of putting the pattern light generating member into the optical path, and the pattern light generating member put in the optical path generates pattern light having a pattern from incident light and causes the pattern light to enter the imaging optical system as the measurement light.

15. The aberration measurement apparatus according to claim 14, wherein the separation member has a light shielding member freely put in and out of the optical path to guide the measurement light which has passed through the imaging optical system to the measurement unit and to shield the background light which has passed through the imaging optical system from reaching the measurement unit.

16. The aberration measurement apparatus according to claim 1, wherein the measurement unit is configured to measure the aberration of the imaging optical system on the basis of a Shack-Hartmann method.

17. The aberration measurement apparatus according to claim 1, wherein the measurement unit is configured to measure the aberration of the imaging optical system on the basis of interferometry.

18. The aberration measurement apparatus according to claim 1, wherein the measurement unit has a recording unit which records the change of the aberration of the imaging optical system with time.

19. An aberration measurement method of measuring the aberration of an imaging optical system, the method comprising:
supplying the imaging optical system with measurement light for the measurement of the aberration of the imaging optical system and background light different from the measurement light;
separating the measurement light and the background light which have passed through the imaging optical system; and
measuring the aberration of the imaging optical system on the basis of the measurement light separated.

20. The aberration measurement method according to claim 19, wherein the measurement light and the background light are spatially separated in an object plane of the imaging optical system and supplied to the imaging optical system.

21. The aberration measurement method according to claim 19, wherein the measurement light and the background light are temporally separated and supplied to the imaging optical system.

22. The aberration measurement method according to any one of claims 19, wherein measuring the aberration includes measuring a change of the aberration of the imaging optical system with time on the basis of a Shack-Hartmann method or interferometry.

* * * * *